F. GOBLE.
CURRYCOMB.
APPLICATION FILED JUNE 30, 1909.

972,690.

Patented Oct. 11, 1910.
2 SHEETS—SHEET 1.

Witnesses
Frank Hough
U. B. Hillyard

Inventor
Frank Goble,
By Victor J. Evans
Attorney

THE NORRIS PETERS CO., WASHINGTON, D. C.

UNITED STATES PATENT OFFICE.

FRANK GOBLE, OF FAIRPOINT, OHIO.

CURRYCOMB.

972,690.  Specification of Letters Patent.  Patented Oct. 11, 1910.

Application filed June 30, 1909. Serial No. 505,272.

*To all whom it may concern:*

Be it known that I, FRANK GOBLE, a citizen of the United States, residing at Fairpoint, in the county of Belmont and State of Ohio, have invented new and useful Improvements in Currycombs, of which the following is a specification.

The purpose of the present invention is to combine in a novel manner in one structure means for combing and brushing the hide of animals and at the same time providing a receptacle for catching the loose hair, dirt or other matter removed during the grooming operation.

The invention has for its object to combine and arrange the parts in compact form so as to provide a device capable of being easily and conveniently manipulated in substantially the same manner as an ordinary curry comb or brush.

With the above and other objects in view the invention consists of the novel features, details of construction and combinations of parts which hereinafter will be more particularly set forth, illustrated in the accompanying drawings and pointed out in the appended claim.

Figure 1:
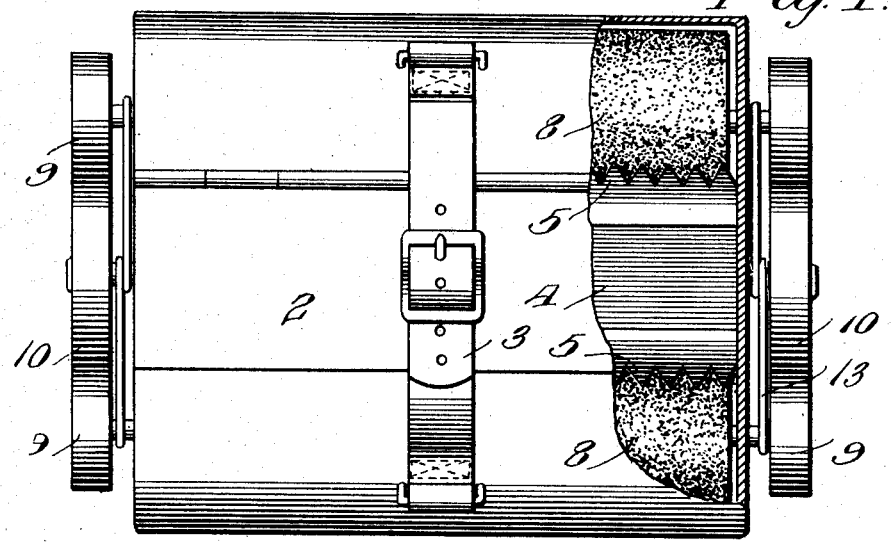
Figure 2:
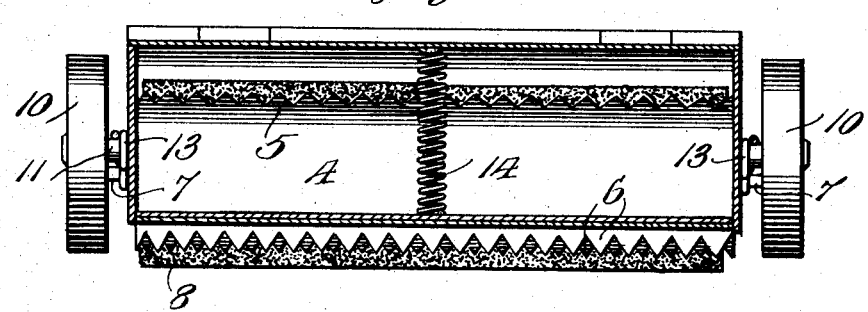
Figure 3:
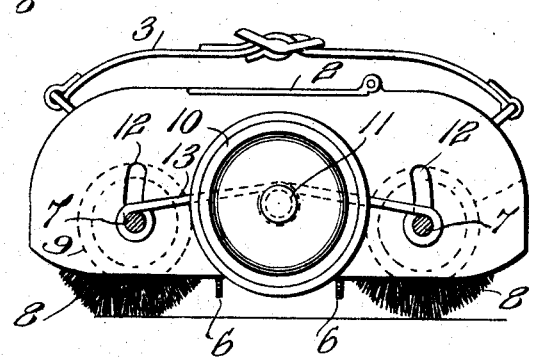
Figure 4:
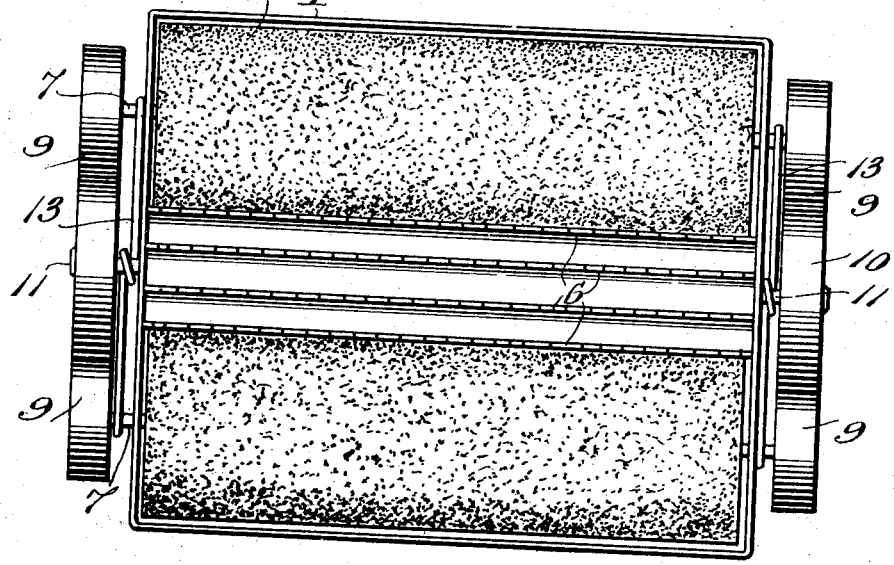
Figure 5:
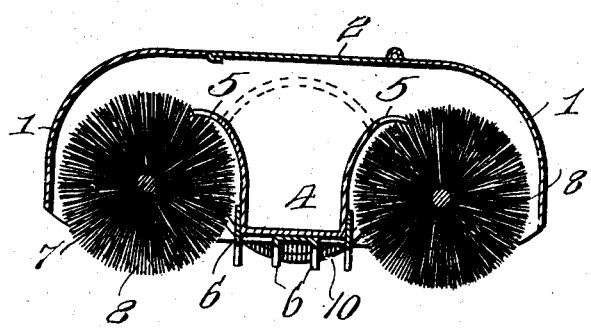

Referring to the drawings forming a part of the specification: Figure 1 is a top plan view of a combined curry comb and brush embodying the invention, an end portion of the casing being broken away. Fig. 2 is a vertical central longitudinal section thereof. Fig. 3 is an end view of the device, the brush shafts being in section and their pulleys omitted. Fig. 4 is a view of the combined brush and comb inverted. Fig. 5 is a vertical central transverse section of the device.

Corresponding and like parts are referred to in the following description and indicated in all the views of the drawings by the same reference characters.

The operating parts, that is, the comb, brush and receptacle for catching the dirt, loose hair and the like are suitably housed being inclosed within a casing 1 which is light and preferably formed of sheet metal. The lower side of the casing is open so as to expose the comb and brush. A door 2 closes an opening formed centrally in the top of the casing and by means of which access is had to the receptacle for removing the foreign matter accumulated therein. A strap 3 or other hand-piece is provided for convenience of securing the device to the hand of the operator when in use.

The receptacle 4 for receiving the loose hair and other matter removed from the hide of the animal during the grooming operation is centrally disposed within the casing and is open at the top and has its side walls flared at their upper edges and terminating in teeth 5 to engage with and remove the foreign matter from the brush in the operation of the device. The receptacle 4 may be of any light and substantial construction and secured within the casing in any manner. Strips 6 are secured to the sides and bottom of the receptacle 4 and serve to stiffen and strengthen the same and their lower edges are toothed so as to provide comb elements. It will be understood that the receptacle 4 forms in effect a back for the comb, the latter consisting of the toothed strips 6.

The brush comprises a series of rotary elements, two being illustrated and one arranged upon each side of the receptacle and between it and the adjacent end of the casing. Each rotary element consists of a shaft 7 and bristles 8, the latter being secured to the shaft in any substantial way. The end portions of the shafts 7 are mounted in the ends of the casing and extend beyond said casing and are provided with pulleys 9 which are in frictional engagement with other pulleys 10 mounted upon journals 11 projecting outward from the ends of the casing. Curved slots 12 are formed in the ends of the casing concentric with the journals 11 and receive the projecting ends of the shafts 7 thereby admitting of the rotary brush elements having a limited vertical play. A spring 13 is mounted upon each journal 11 and its arms engage with the ends of the shafts 7, said springs normally exerting a pressure to hold the rotary brush elements projected. Normally the brush extends beyond the teeth of the comb thereby admitting of the hair being brushed without application of the comb. When it is desired to bring the comb into operation, pressure is exerted upon the casing sufficient to overcome the tension of the springs 13 whereby the rotary brush elements are pressed inward and the teeth of the comb forced outward so as to operate effectively upon the hide. The pulleys 9 and 10 are at all times in frictional engagement and their outer edges may be covered with rubber, leather or other material to prevent slipping and insure positive rotation of the brush elements when the device is in use.

When the device is in operation, the pulleys 10 are caused to rotate by tractive force with the hide of the animal thereby causing the brush elements to rotate and remove the loose hair and other matter detached from the hide by the action of the teeth of the comb. The brushes are kept clean by contact with the teeth 5, which latter also serve to direct the matter detached from the brushes into the receptacle 4. When it is required to clear the receptacle 4 of accumulated matter, the door 2 is opened and the device inverted so as to dump the matter through the opening in the top of the casing after the latter has been inverted. The doors 2 may be held closed by any means and for this purpose a spring 14 is provided as indicated most clearly in Fig. 2.

It is observed that the brushes 8 rotate alternately in opposite directions as the device is moved backward and forward over the hide. As the device is moved in one direction the forward brush is rotated rearwardly or in an anticlockwise direction, thereby enabling the matter removed by the teeth 5 from the forward brush to be directed into the receptacle 4. Inasmuch as the device is passed backward and forward over the hide a number of times, it will be understood that the foreign matter removed from the skin and hair will ultimately find its way into the receptacle 4.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention, what is claimed is—

The herein described combined curry comb and brush comprising a casing having a centrally disposed door controlled opening in its top and having curved slots in its end walls, a centrally disposed receptacle having opposite side walls flared and toothed along their upper edges, toothed strips secured to the lower portion of the receptacle to stiffen and brace the same, rotary brush elements having the end portions of their shafts extending through the curved slots in the end walls of the casing, pulleys fast to the projecting ends of the shafts, other pulleys mounted upon the end walls of the casing and in frictional engagement with the pulleys fast to the ends of the rotary brush shafts, and springs normally exerting an outward pressure upon the rotary brush elements.

In testimony whereof I affix my signature in presence of two witnesses.

FRANK GOBLE.

Witnesses:
SAMUEL GOBEL,
GEORGE GOBEL.